United States Patent [19]

Kishi et al.

[11] Patent Number: 4,593,403
[45] Date of Patent: Jun. 3, 1986

[54] SPEECH RECOGNITION SYSTEM AND METHOD FOR AN AUTOMOTIVE VEHICLE

[75] Inventors: Norimasa Kishi; Kazunori Noso, both of Yokohama, Japan

[73] Assignee: Nissan Motor Company, Limited, Yokohama, Japan

[21] Appl. No.: 428,232

[22] Filed: Sep. 29, 1982

[30] Foreign Application Priority Data

Oct. 22, 1981 [JP] Japan .............................. 56-167949

[51] Int. Cl.⁴ .............................................. G10L 1/00
[52] U.S. Cl. ..................................... 381/43; 381/110; 381/86; 364/513.5
[58] Field of Search .................... 381/41–43, 381/110, 86; 364/513, 513.5

[56] References Cited

U.S. PATENT DOCUMENTS

4,181,821  1/1980  Pirz et al. .............................. 381/43
4,479,197 10/1984  Haag et al. ........................... 364/900

Primary Examiner—E. S. Matt Kemeny
Attorney, Agent, or Firm—Lowe, King, Price & Becker

[57] ABSTRACT

A speech recognition system for an automotive vehicle sequentially activates at least one device having plural different operating modes in accordance with a plurality of spoken instructions without repeating the same phrase. To adjust fender mirrors, for instance, first the driver says "Mirror" while depressing a recognition switch to stop the moving mirror; secondly the driver says "Right, horizontally", thirdly the driver says "Right, vertically" after having depressed a reset switch; lastly the driver says "Stop". The speech recognition system comprises a reset switch, at least one device instruction phrase memory, plural operation-mode instruction phrase memories, and a reference pattern memory selector for selecting the device memory or an appropriate operation-mode memory, in addition to or in place of a section of a conventional speech recognizer.

8 Claims, 4 Drawing Figures

SPEECH RECOGNITION SYSTEM AND METHOD FOR AN AUTOMOTIVE VEHICLE

BACKGROUND OF THE INVENTION

1. Field of the Invention

The present invention relates generally to a speech recognition system for an automotive vehicle, and more particularly to a speech recognition system by which a plurality of similar spoken instructions including the same phrase can be recognized separately, without repeating the same phrase, in order to improve the recognition rate.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "headlight off". Such a speech recognizer usually can recognize various spoken instructions in order to control various actuators; however, there are some problems involved in applying this system to an automotive vehicle.

In an automotive vehicle, it is desirable to actuate various equipment or devices such as head lights, wipers, a car-radio, fender mirrors, door windows, etc. by the use of a speech recognition system. These automotive vehicle mounted devices can be classified into two groups from the standpoint of operation modes. One group includes on-off type devices such as head lights, wipers, window washers, car-radio, etc., which are simply turned on or off; the other group includes adjustable-type devices such as fender mirrors, door windows, etc. For instance, in the case of the fender mirrors, it is necessary for the driver to adjust one or both of the right-hand and left-hand fender mirrors and further adjust it in one or both of the horizontal and vertical directions in which the mirror is moved for adjustment. In the case of the door windows, the driver must open or close one or both of the right-hand and left-hand door windows. Further, in the case of driver seats, there are two seats such as a driver seat or a passenger seat, and the driver must determine the operation modes to move the seat frontward or rearward or to tilt the seat back frontward or rearward.

In the case where the devices having two or more operation modes are required to be adjusted with a speech recognizer, the driver usually actuates the device in an operation-mode sequence. In the case of fender mirrors, for instance, the right-hand mirror is first adjusted in the horizontal direction and then in the vertical direction. Thereafter, the left mirror is adjusted in the horizontal direction and then in the vertical direction. In the case of a seat, the seat is moved frontward and then the seat back is tilted backward. In the case of door windows, the right window is opened and then the left window is opened.

Therefore, for instance, in the case where the fender mirrors are adjusted, four instruction phrases, namely "Right-mirror, horizontally", "Right-mirror, vertically", "Left-mirror, horizontally" and "Left-mirror, vertically" must be recorded and recognized by the speech recognizer sequentially.

In order to reduce the capacity of a memory unit in the recording mode, there has been proposed a method wherein spoken instructions indicative of the kinds of devices to be actuated (referred to as "device instruction phrases") such as "Mirror" and spoken instructions indicative of the kinds of operation modes to be adjusted (referred to as "operation-mode instruction phrases") such as "Right, horizontally" or "Right, vertically" are recorded separately and recognized independently, because an instruction phrase "Mirror" is common to the spoken instructions. In the method as described above, it is possible to reduce the capacity of a memory unit for each instruction phrase, thus improving the recognition rate since the length of each instruction phrase is short. The reduced capacity is possible even though the total number of instruction phrases to be recorded in the speech recognizer increases in the spoken instruction recording mode.

In the prior-art method in which device insruction phrases and operation-mode instruction phrases are recorded separately in the recording mode, since all the instruction phrases "Mirror, right, horizontally", "Mirror, right, vertically", "Mirror, left, horizontally", and "Mirror, left vertically" must be supplied sequentially to the speech recognizer in the recognition mode, it is very troublesome to say the similar spoken instructions repeatedly. Additionally, since the system must recognize similar sequential spoken instructions, there is a danger of misrecognition.

A more detailed description of a typical speech recognizer will be made with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide an automotive vehicle speech recognition system for sequentially activating at least one device having a plurality of different operation modes, in accordance with a plurality of spoken instructions, without repeating the same or similar instruction phrase.

In order to adjust fender mirrors by the system according to the present invention, for instance, the right-hand and left-hand fender mirror can be adjusted when the driver first says "Mirror" while the driver is depressing a recognition switch, secondly says "Right, horizontally", thirdly says "Right, vertically" after having depressed a reset switch to stop the moving mirror, fourthly says "Left, horizontally" after having depressed the reset switch to stop the moving mirror, fifthly says "Left, vertically" after having depressed the reset switch to stop the moving mirror, and lastly says "Stop".

To achieve the above mentioned object, the speech recognition system according to the present invention comprises a reset switch for resetting an operation-mode instruction phrase recognized by the system, a reference pattern memory unit comprising at least one device instruction phrase memory unit for storing reference spoken instruction signals corresponding to at least one device and a plurality of operation-mode instruction phrase memory units for storing reference spoken instruction signals corresponding to a plurality of operation-modes for the at least one device, and a reference memory unit selector for selecting one of the device instruction phrase memory unit and operation-mode instruction phrase memory units in response to the resetting signal from the reset switch, in addition to or in place of a certain section or function of the conventional speech recognizer.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
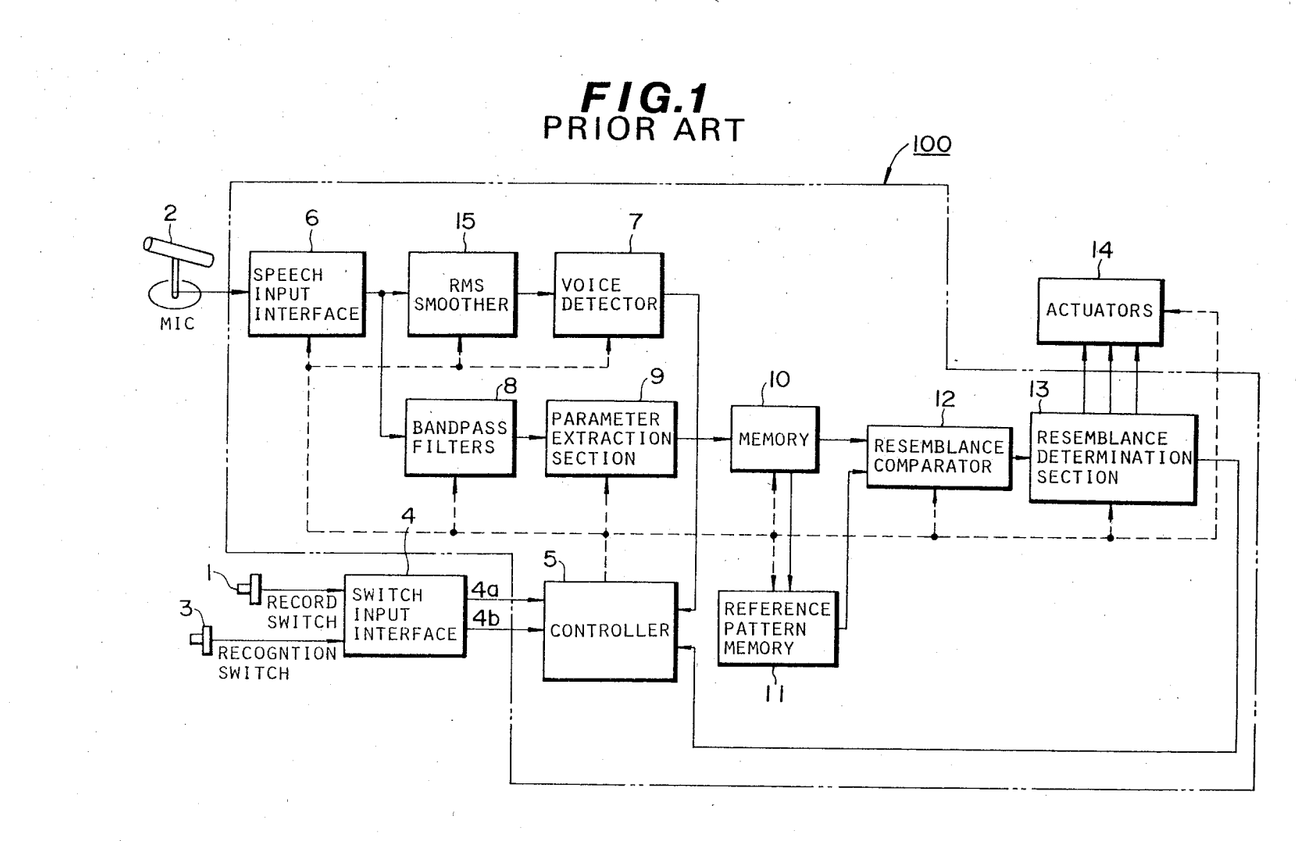
FIG. 1 is a schematic block diagram of a typical speech recognizer for assistance in explaining the operations thereof.

FIG. 1 is a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and supplies a signal to a controller 5 via a wire 4a. In response to this signal, the controller 5 supplies a recording mode command signal to other sections in order to preset the entire speech recognizer to the recording mode. In the spoken instruction recording mode, when the user says a phrase to be used as a spoken instruction, such as "Car radio on", near a microphone 2, the spoken phrase is transduced into a corresponding electric signal by the microphone 2, amplified by a speech input interface 6 including mainly a spectrum-normalizing amplifier, smoothed by a root-mean-square (RMS) smoother 15 including a rectifier and a smoother, and finally coupled to a voice detector 7. This voice detector 7 detects whether or not the magnitude of the spoken phrase signals exceeds a predetermined level for a predetermined period of time (150 to 250 ms) in order to determine the start of the spoken phrase input signals and whether or not the magnitude of the signals drops below a predetermined level for a predetermined period of time in order to determine the end of the signals. Upon detection of the start of the signals, voice detector 7 supplies another recording mode command signal to the controller 5. In response to this command signal, the controller 5 activates a group of bandpass filters 8, so that the spoken phrase signal from the microphone 2 is divided into a number of predetermined frequency bands. In a parameter extraction section 9, the frequency-divided spoken phrase signals are (1) squared or rectified in order to derive the voice power spectrum for each of the frequency bands and (2) then converted into corresponding digital time-series matrix-phonetic pattern data (described later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user utters speech instructions, such as "Car radio on", to the speech recognizer through the microphone 2 while depressing a recognition switch 3.

When this recognition switch 3 is depressed, the switch input interface 4 detects the depression of the recognition switch 3 and supplies a signal to the controller 5 via a wire 4b. In response to this signal, the controller 5 supplies a recognition mode command signal to other sections in order to preset the entire speech recognizer to the recognition mode. In this spoken phrase recognition mode, when the user utters into microphone 2 an instruction phrase similar to the one recorded previously and when the voice detector 7 outputs a signal, the spoken instruction is transduced into a corresponding electric signal by the microphone 2, amplified by the speech input interface 6, filtered and divided into voice power spectra across the frequency bands by the band pass filters 8, squared or rectified and further converted into corresponding digital time-series matrix-phonetic pattern data by the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the speech instruction supplied to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next fed to a resemblance determination section 13 to determine whether or not the calculated values lie within a predetermined range, that is, to evaluate the cross-correlation thereof. If within the range, a command signal, indicating that a recognition-mode spoken instruction having adequate resemblance to one of the recorded instruction phrases, is supplied to one of actuators 14 in order to turn on the car radio, for instance. The above-mentioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 are all incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. CAR RADIO ON), i denotes the filter index, and j denotes time-series increment index.

If a first recognition-mode speech instruction (e.g. CAR RADIO ON) is denoted by the character "B", the Tchebycheff distance can be obtained from the following expression:

$$l = |F(A) - F(B)| = \sum_{i=1}^{4} \sum_{j=1}^{32} |f^A(i,j) - f^B(i,j)|$$

Figure 2:
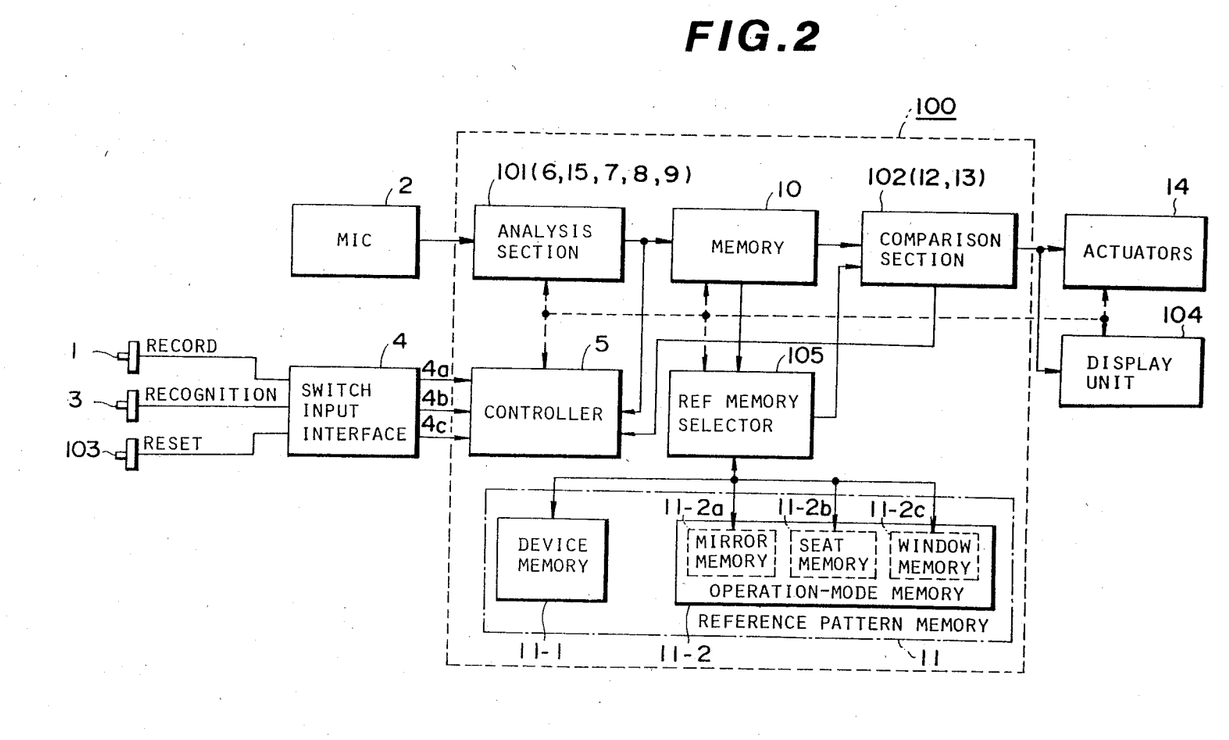
FIG. 2 is a schematic block diagram of a first embodiment of the speech recognition system for an automotive vehicle according to the present invention.

In view of the above description and with reference to the attached drawings, a first embodiment of the present invention is described with respect to its application to the actuators to adjust fender mirrors, seats and door windows, in particular to the case of fender mirrors.

In FIG. 2, there is illustrated an analysis section including the speech input interface 6, the RMS smoother 15, the voice detector 7, the bandpass filters 8 and the parameter extraction section 9. Comparison section 102 includes the resemblance comparator 12 and the resemblance determination section 13. Reset switch 103 is connected to the switch input interface 4. When this reset switch 103 is depressed, the currently-recognized spoken instruction is at once cancelled and the recognition system returns to the original spoken-instruction recognition mode. Display unit 104 displays recognized results or a certain appropriate message such that a spoken instruction should be supplied to the recognition system again since a spoken instruction is not recognized correctly by the system. Reference pattern memory 11 includes a device instruction phrase memory unit 11-1 and an operation-mode instruction phrase memory unit 11-2. In the device instruction phrase memory unit 11-1, there are stored different device instruction phrases indicative of, for instance, three devices with four different operation modes such as "Mirror", "Seat", and "Window". The operation-mode instruction phrase memory unit 11-2 further includes, for instance, three memory units for a mirror memory unit 11-2a, a seat memory unit 11-2b and a window memory unit 11-2c. In the mirror memory unit 11-2a, there are stored, for instance, four different operation-mode instruction phrases such as "Right, horizontal", "Right, vertical", "Left, horizontal", and "Left, vertical". In the seat memory unit 11-2b, there are stored, for instance, four different operation-mode instruction phrases such as "Move, frontward", "Move, rearward", "Tilt, frontward", and "Tilt rearward". In the window memory unit 11-2c, there are stored, for instance, four different operation-mode instruction phrases, such as "Right, open", "Right, close", "Left, open", and "Left close". Reference pattern memory selector 105 can switch the connection between the comparison section 102 and the device instruction phrase memory unit 11-1 to the connection between the comparison section 102 and the operation-mode instruction phrase memory unit 11-2 in accordance with a command signal derived from the controller 5.

Now, follows a description of the operation of the first embodiment of the speech recognition system according to the present invention.

When the recognition mode switch 3 is depressed, the switch input interface 4 detects the depression of the switch 3 and supplies a signal to the controller 5 via the wire 4b. In response to this signal, the controller 5 feeds a recognition mode command signal to other sections or units in order to preset the entire speech recognizer to the recognition mode. At the same time, the device instruction phrase memory unit 11-1 is connected to the comparison section 102 via the reference memory selector 105 in response to a command signal from the controller 5. Under these conditions, "Say a device phrase" is indicated on the display unit 104. If the driver utters into microphone 2 the device instruction phrase "Mirror", the spoken instruction is analyzed by the analysis unit 101, and compared in comparison section 102 with the device instruction phrases stored in the device instruction phrase memory unit 11-1. In this case, if the voice volume of the spoken phrase is too low or if ambient noise is too large, an appropriate instruction corresponding thereto, for instance, such as "Say again" is indicated on the display unit 104. Therefore, if some instruction is displayed, the driver must say the same spoken instruction again.

When a device instruction phrase is recognized by the comparison section 102, the comparison section 102 supplies a command signal to the controller 5, which supplies other command signals to the display unit 104 and the reference pattern memory selector 105. In response to these command signals, the phrase "Mirror. Say operation-mode phrase" displayed is on unit 104; the reference pattern memory selector 105 connects the comparison section 102 to the mirror memory 11-2a in the operation-mode instruction phrase memory 11-2.

Further, in this embodiment, when a wrong instruction phrase is supplied to the system, it is possible to return the system to the original condition by depressing the reset switch 103. When the reset switch 103 is depressed, the switch input interface 4 detects the depression of the switch 103 and supplies a signal to the controller 5 via the wire 4c. Therefore, a resetting command signal is fed by the controller 5 to the other sections or units to cancel the currently-recognized spoken instructions.

Furthermore, in case the system erroneously recognizes another wrong instruction phrase in spite of the fact that a correct instruction phrase is uttered (for instance, in case "Seat" is recognized in spite of the fact that "Mirror" is uttered) it is desirable to exclude the erroneously recognized instruction phrase ("Seat" in this case) from other instruction phrases to be recognized when the succeeding device instruction phrase is supplied to the system.

Next, when the driver utters into microphone 2 "Right, horizontal", which is one of the operation-mode instruction phrases, the instruction phrase is analyzed in the same way as described above, by the analysis section 101 and compared with the operation-mode instruction phrases stored in the operation-mode instruction phrase memory unit 11-2a by the comparison section 102. After the operation-mode instruction phrase has been recognized, the controller 5 supplies a command signal to one of the actuators 14 to adjust the right fender mirror horizontally. As a result, the right-hand fender mirror begins to move horizontally. Therefore, when the driver depresses the reset switch 103 at the instant when the right-hand fender mirror has been moved to a desirable horizontal angular position, the fender mirror stops moving and the speech recognition system returns to the operation-mode instruction phrase recognition mode, without returning to the original device instruction phrase recognition mode.

Then, when the driver utters into microphone 2 "Right, vertically", the operation-mode instruction phrase is recognized in the same way as described above. After the instruction phrase has been recognized, the controller 5 supplies another command signal to one of the actuators 14 to adjust the right fender mirror vertically. As a result, the right-hand fender mirror begins to move vertically. When the driver depresses the reset switch 103 at the instant when the fender mirror has moved to a desirable vertical angular position, the fender mirror stops moving and the speech recognition system returns to the operation-mode instruction phrase recognition mode, without returning to the original device instruction phrase recognition mode.

Thereafter, in a similar manner, when "Left, horizontal" is supplied to the recognition system the mirror moves horizontally. When the desired horizontal angular position is reached, the driver depresses the reset switch 103 and then inputs the succeeding operation-mode instruction phrase "Left, vertically". As a result, the left-hand fender mirror moves vertically. When the mirror reaches the desired vertical angular position, the driver says "Stop", causing the movement of the left-hand mirror to stop. This completes adjustment operations of both of the right- and left-hand fender mirrors.

Figure 3:
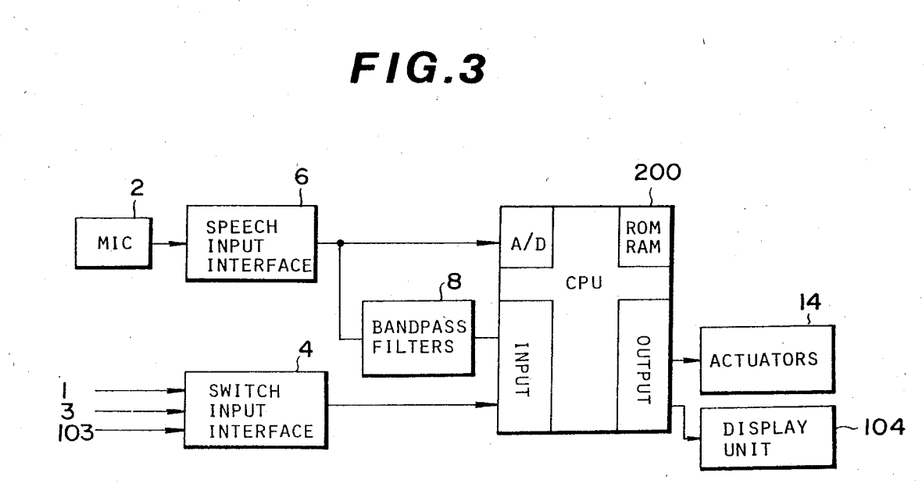
FIG. 3 is a schematic block diagram of a second embodiment of the speech recognition system for an automotive vehicle according to the present invention, in which a microcomputer is included.

FIG. 3 is a block diagram of the speech recognition system according to the present invention wherein microcomputer 200 includes reference pattern memory selector 105 and reference pattern memory unit 11 containing device instruction phrase memory unit 11-1 and operation-mode instruction phrase memory unit 11-2, the essential sections or units in the present invention. Thus, all of the functions of the present invention are implemented via operations executed in accordance with appropriate software, in place of hardware.

In addition, in this embodiment, various elements or sections necessary for the speech recognizer 100 are all incorporated in the microcomputer 200, excluding the speech input interface 6 and the bandpass filters 8 (it is also possible to incorporate these elements when necessary). The microcomputer is programmed to perform the same functions as the discrete elements or sections.

Figure 4:
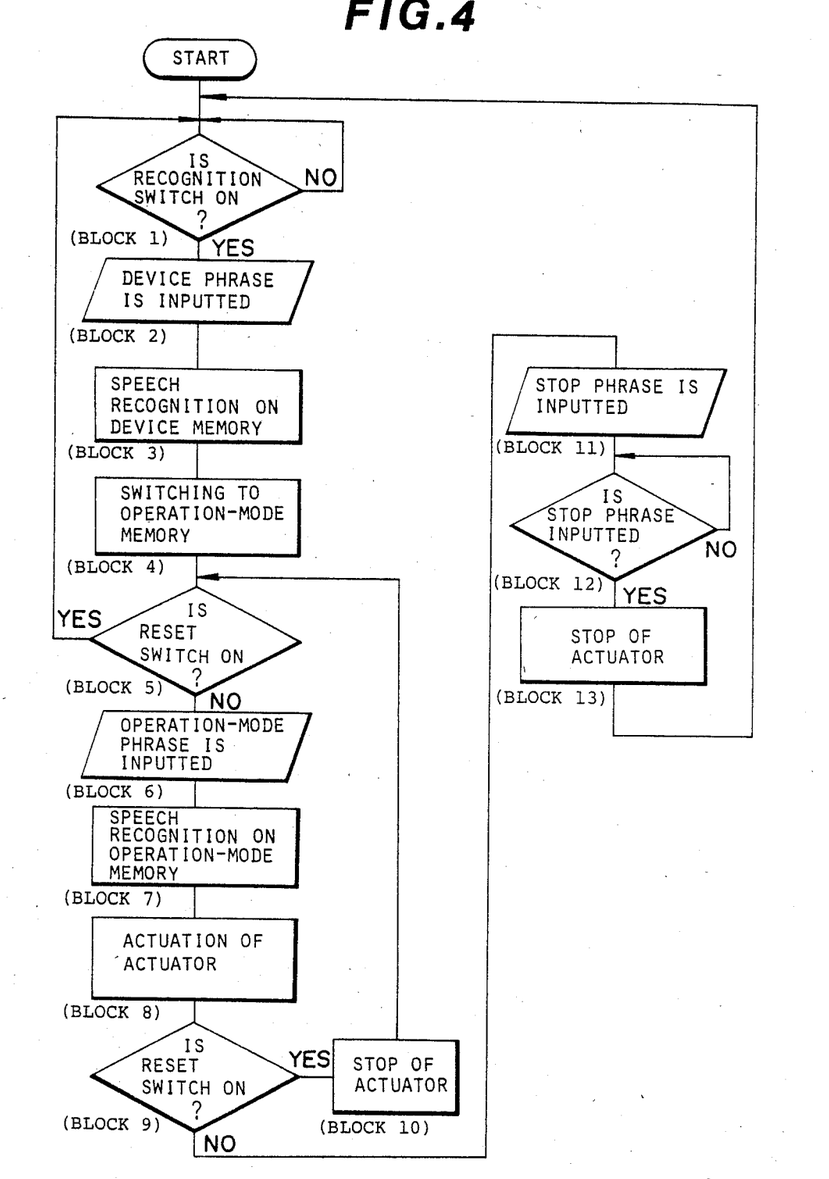
FIG. 4 is a flowchart for the method of repeatedly activating the adjustable-type actuator sequentially in response to spoken instruction phrases, in accordance with a program stored in the microcomputer shown in FIG. 3.

FIG. 4 is a flowchart of the processing steps for activating the actuators in operation-mode sequence.

In FIG. 4, program control in the microcomputer 200 first determines whether or not the recognition switch 3 is depressed (block 1). If switch 3 is not depressed, the program stands-by awaiting depression of the recognition switch 3. If the recognition switch 3 is depressed, the program advances to the next block 2. If a spoken instruction phrase indicative of one of the actuating devices is supplied to the microcomputer 200, the supplied device instruction phrase is recognized by a comparison with one of the reference patterns stored in the device instruction phrase memory unit (block 3). After the device instruction phrase has been recognized, the connection between the comparison section 102 and the reference pattern memory unit 11 is switched from the device instruction phrase memory unit 11-1 to the operation-mode instruction phrase memory unit 11-2a (block 4), indicating "Say operation-mode phrase" on the display unit. In this step, if the reset switch 103 is depressed, since, a resetting command signal is supplied to all of the sections in the microcomputer 200, the program returns to the original state (block 5). If the reset switch 103 is not depressed and if an instruction phrase indicative of one of operation-modes corresponding to the device recognized in block 3 is supplied to the microcomputer 200 (block 6), the supplied instruction phrase is recognized by a comparison with one of reference patterns stored in the operation-mode instruction phrase memory unit 11-2a (block 7). Therefore, the corresponding actuator begins to operate and to adjust the recognized device in the recognized operation-mode (block 8). In this step, if the reset switch 103 is depressed (block 9), the moving actuator is halted (block 10) and the program control returns to block 5 to wait for the succeeding operation-mode instruction phrase. The program steps from block 5 to block 10 are repeated until the device recognized in block 3 is adjusted as necessary in the various operating modes thereof. When the device has been adjusted in all the necessary operating modes, the driver says "Stop" to stop the adjustment operation. If the stop instruction phrase is supplied to the system (in block 11), the program determines the presence of the stop instruction phrase (in block 12), the actuator is stopped since the adjustment operations in every operation mode have been completed, returning to the original step (block 1) again.

In brief, in the speech recognition system according to the present invention, the driver can actuate an adjustable-type device by (a) first saying a device instruction phrase (e.g., "Mirror") while depressing the recognition switch, (b) secondly saying a first operation-mode instruction phrase (e.g., "Right, horizontally"), (c) thirdly sequentially saying the succeeding operation-mode instruction phrases (e.g., "Right, vertically", etc.) after depressing the reset switch to stop the moving device at a desired position, and lastly saying a stop instruction phrase ("Stop").

As described above, in the speech recognition system according to the present invention, it is possible to simplify the instruction phrases, since means for resetting the recognition mode of operation-mode instruction phrases is additionally provided, in the case where a device having a plurality of operation modes is actuated via a speech recognizer, that is, where a plurality of operation-modes for a single device are sequentially instructed by the driver. The simplification occurs because, after one device instruction phrase has been supplied to the system, it is unnecessary to say the same device instruction phrase repeatedly if only the resetting means is depressed repeatedly to stop the moving device and thereafter other operation-mode instruction phrases are uttered. Thus, it is additionally possible to improve the recognition rate reliability.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A speech recognition system for an automotive vehicle for sequentially actuating a device having a plurality of different operating modes by a plurality of actuators in accordance with a plurality of spoken instructions coupled through a microphone, which comprises:
   (a) recognizing means for separately recognizing a spoken instruction corresponding to (1) the device and (2) plural operating modes for the device and for deriving signals to actuate the corresponding actuators;
   (b) first memory means for storing a reference spoken instruction signal corresponding to the device;
   (c) a plurality of second memory means for storing reference spoken instruction signals corresponding to a plurality of operation-modes for the device;
   (d) resetting means connected to said recognizing means for deriving a reset signal; and
   (e) selecting means for connecting said recognizing means to said first memory to recognize the device instruction phrase and then sequentially to one of said second memory means to recognize the operation-mode instruction phrases and to actuate an actuator corresponding to the recognized operation-mode instruction phrases, the recognized spoken instruction phrase being cancelled in response to the reset signal, and the actuated actuator being stopped and the operation-mode being renewed in response to the reset signal, whereby the actuator corresponding to the recognized operation-mode instruction phrases can be actuated without uttering the same device spoken instruction repeatedly.

2. A speech recognition system for an automotive vehicle for sequentially actuating a device having a plurality of different operation modes by sequentially energizing a plurality of actuators in accordance with a plurality of spoken instructions uttered into a microphone, which comprises:
   (a) a recognition switch (3) for deriving a recognizing signal when closed;
   (b) a reset switch (103) for deriving a reset signal when closed;
   (c) an analysis section (101) for analyzing spoken instruction signals supplied thereto by the microphone while said recognition switch is closed;
   (d) a memory unit (10) for storing spoken instruction signals analyzed by said analysis section;
   (e) a comparison section (102) for comparing the spoken instruction signals stored in said memory unit with previously stored reference spoken instruction signals and for activating one of the actuators separately when both the signals match;
   (f) a reference pattern memory unit (11) including:
      (1) at least one device instruction phrase memory unit (11-1) for storing reference spoken instruction signals corresponding to at least one device; and
      (2) a plurality of operation-mode instruction phrase memory units (11-2) for storing reference spoken instruction signals corresponding to a plurality of operation-modes for the at least one device;
   (g) a reference pattern memory selector (105) for switching connections which normally subsist between said comparison section and said device instruction phrase memory unit to establish connections between said comparison section and one of said operation-mode instruction phrase memory units; and
   (h) a controller connected to said recognition switch, said reset switch, said analysis section, said memory unit, said comparison section, said reference pattern memory unit, and said reference pattern memory selector, said controller supplying various command signals to the entire system in such a way that:
      (1) said reference pattern memory selector connects said comparison section to said at least one device instruction phrase memory unit for recognizing at least one device instruction phrase in response to the recognizing signal;
      (2) after the device instruction phrase has been recognized, said reference pattern memory selector automatically connects said comparison section to one of said operation-mode instruction phrase memory units corresponding to the recognized device for recognizing one of the operation-mode instruction phrases to actuate one of the actuators corresponding thereto;
      (3) the recognized spoken instruction phrase is cancelled in response to the resetting signal; and
      (4) the actuated actuator is stopped and said reference pattern memory selector connects said comparison section to the succeeding one of said operation-mode instruction phrase memory units corresponding to the recognized device for recognizing the succeeding one of operation-mode instruction phrases to actuate one of the actuators corresponding thereto in response to the resetting signal,
   whereby after a device instruction phrase has once been supplied to the system, it is possible to sequentially actuate a plurality of actuators corresponding to a device by closing said reset switch repeatedly and deriving only the operation-mode instruction phrase sequentially without uttering the same device spoken instruction repeatedly.

3. The automotive vehicle speech recognition system of claim 2, wherein said analysis section, said memory unit said comparison section, said reference pattern memory unit, said reference pattern memory selector and said controller are all incorporated in a microcomputer.

4. The automotive vehicle speech recognition system of claim 2, further comprising a display unit for sequentially indicating one of the necessary succeeding spoken instruction phrases and necessary messages thereon in letter form.

5. The automotive vehicle speech recognition system of claim 2, wherein said device instruction phrase memory unit stores reference spoken instruction signals corresponding to a fender-mirror actuating device and said operation-mode instruction phrase memory units store reference spoken instruction signals corresponding to one of right- and left-hand fender mirrors and one of horizontal and vertical adjustments, and actuator means for horizontally and vertically moving the right and left mirrors in response to an output signal of the comparison means.

6. The automotive vehicle speech recognition system of claim 2, wherein said device instruction phrase memory unit stores reference spoken instruction signals corresponding to a seat actuating device and said operation-mode instruction phrase memory units store reference spoken instruction signals corresponding to one of frontward and rearward seat adjustments and one of frontward and rearward seat back adjustments, and actuator means for the frontward and rearward seat adjustments responsive to an output signal of the comparison means.

7. The automotive vehicle speech recognition system of claim 2, wherein said device instruction phrase memory unit stores reference spoken instruction signals corresponding to door window actuating device and said operation-mode instruction phrase memory units store reference spoken instruction signals corresponding to one of right- and left-hand door windows and one of opening and closing adjustments, and actuator means for opening and closing the right and left door windows in response to an output signal of the comparison means.

8. A method of sequentially actuating at least one device having a plurality of different operation modes with actuators in accordance with plural spoken instructions supplied to a speech recognizer through a microphone and recognized by the speech recognizer provided with a recognition switch, a reset switch, a comparison section, at least one device instruction phrase memory unit, and a plurality of operation-mode instruction phrase memory units, which comprises the following steps in the named sequence of:

(a) determining whether or not the recognition switch is kept closed;

(b) if the recognition switch is closed, supplying at least one of the device instruction phrases to the speech recognizer for recognizing the device;

(c) recognizing the supplied device instruction phrase on the basis of at least one reference device instruction phrase stored in the device instruction phrase memory unit;

(d) changing a normal connection between the comparison section and the device instruction phrase memory unit to a connection between the comparison section and one of the operation-mode instruction phrase memory units in the system;

(e) determining whether or not the reset switch is closed;

(f) if the reset switch is closed, returning to step (a) above;

(g) if the reset switch is not closed, supplying one of the operation-mode instruction phrases to the speech recognizer for recognizing the operation mode;

(h) recognizing the supplied operation-mode instruction phrase on the basis of a reference operation-mode instruction phrase stored in one of the operation-mode instruction phrase memory units;

(i) actuating one of the actuators corresponding to the recognized operation-mode instruction phrase;

(j) determining whether or not the reset switch is closed;

(k) if the reset switch is closed, stopping the actuator and returning to step (e) above; and (l) if the reset switch is not closed, supplying a spoken instruction phrase corresponding to device-stop to stop all the actuators and then return to step (a) above.

* * * * *